United States Patent
Gohs et al.

(10) Patent No.: US 11,063,502 B2
(45) Date of Patent: Jul. 13, 2021

(54) METHOD AND ONE-PIECE TOOL ASSEMBLY FOR PRODUCING A STATOR FOR AN ELECTRICAL MACHINE

(71) Applicant: CONTINENTAL AUTOMOTIVE GMBH, Hannover (DE)

(72) Inventors: Axel Gohs, Berlin (DE); Christoph Radtke, Berlin (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 264 days.

(21) Appl. No.: 15/925,095

(22) Filed: Mar. 19, 2018

(65) Prior Publication Data

US 2018/0212499 A1 Jul. 26, 2018

Related U.S. Application Data

(63) Continuation of application No. PCT/EP2016/070812, filed on Sep. 5, 2016.

(30) Foreign Application Priority Data

Sep. 18, 2015 (DE) .................... 10 2015 217 936.2

(51) Int. Cl.
*H02K 15/04* (2006.01)
*H02K 15/08* (2006.01)
(Continued)

(52) U.S. Cl.
CPC ..... *H02K 15/0435* (2013.01); *H02K 15/0031* (2013.01); *H02K 15/0428* (2013.01); *H02K 15/085* (2013.01)

(58) Field of Classification Search
CPC ........... H02K 15/0435; H02K 15/0428; H02K 15/04; H02K 15/0414; H02K 15/00;
(Continued)

(56) References Cited

U.S. PATENT DOCUMENTS 3,641,648 A * 2/1972 Kalberman ....... H01L 21/67144
228/6.2
3,834,014 A * 9/1974 Burr ...................... H01R 43/08
29/598
(Continued)

FOREIGN PATENT DOCUMENTS

CN 1489259 A 4/2004
CN 102362416 A 2/2012
(Continued)

OTHER PUBLICATIONS

International Search Report and Written Opinion dated Dec. 15, 2016 from corresponding International Patent Application No. PCT/EP2016/070812.

(Continued)

*Primary Examiner* — Livius R. Cazan
*Assistant Examiner* — Kaying Kue

(57) ABSTRACT

The disclosure relates to a method for producing a stator, where, for one or both layers of a two-layer winding, a tool with receiving regions is respectively provided on an end face of a laminated core. A relative arrangement of the receiving regions corresponds to a relative end position for conductor ends of the conductor elements. In a positioning process, the tool is moved into a first turning position and each conductor end of a first group of the conductor elements is respectively inserted into one of the receiving regions. Then the tool is turned into at least one further turning position and each conductor end of a further group of the conductor elements is respectively inserted into one of the receiving regions until the conductor ends of all the conductor elements of the layer are in the relative end position in relation to one another.

11 Claims, 8 Drawing Sheets

(51) Int. Cl.
  *H02K 15/085* (2006.01)
  *H02K 15/00* (2006.01)
(58) Field of Classification Search
  CPC .... H02K 15/085; H02K 15/0031; H02K 3/28; H02K 3/04; Y10T 29/49009; Y10T 29/49071; Y10T 29/49073
  USPC .................. 29/605, 592, 606, 596, 732–736
  See application file for complete search history.

(56) References Cited

U.S. PATENT DOCUMENTS

| | | | | |
|---|---|---|---|---|
| 4,160,926 | A * | 7/1979 | Cope | H02K 3/345 |
| | | | | 174/110 N |
| 4,424,939 | A * | 1/1984 | Ohashi | H01F 41/08 |
| | | | | 242/434.8 |
| 4,449,293 | A * | 5/1984 | Itoh | H02K 15/0435 |
| | | | | 140/92.1 |
| 4,491,281 | A * | 1/1985 | Dosaka | H01F 41/08 |
| | | | | 242/434.8 |
| 5,118,153 | A * | 6/1992 | Allison | H05K 13/0447 |
| | | | | 294/131 |
| 5,778,512 | A * | 7/1998 | Ichikawa | H02K 15/0414 |
| | | | | 29/598 |
| 6,055,720 | A * | 5/2000 | Finn | H01F 41/082 |
| | | | | 242/118.4 |
| 6,192,574 | B1 * | 2/2001 | Wargren | H01F 41/06 |
| | | | | 279/3 |
| 6,425,175 | B1 * | 7/2002 | Sawada | H02K 15/0414 |
| | | | | 29/564.1 |
| 6,694,598 | B2 * | 2/2004 | Takahashi | H02K 15/0428 |
| | | | | 29/596 |
| 7,084,541 | B2 * | 8/2006 | Gorohata | H02K 3/505 |
| | | | | 310/180 |
| 8,760,029 | B2 * | 6/2014 | Nagashima | H02K 15/022 |
| | | | | 310/257 |
| 2003/0132679 | A1 * | 7/2003 | Kato | H02K 15/0037 |
| | | | | 310/179 |
| 2003/0167624 | A1 * | 9/2003 | Fortuna | H02K 15/0043 |
| | | | | 29/596 |
| 2003/0233748 | A1 * | 12/2003 | Gorohata | H02K 3/505 |
| | | | | 29/596 |
| 2004/0172805 | A1 * | 9/2004 | Tokizawa | H02K 15/0037 |
| | | | | 29/596 |
| 2005/0081365 | A1 * | 4/2005 | Gorohata | H02K 15/0428 |
| | | | | 29/596 |
| 2005/0214151 | A1 * | 9/2005 | Okaichi | F01C 21/0845 |
| | | | | 418/125 |
| 2008/0036318 | A1 * | 2/2008 | Lee | H02K 15/02 |
| | | | | 310/89 |
| 2010/0077599 | A1 * | 4/2010 | Tokizawa | H02K 15/0478 |
| | | | | 29/596 |
| 2011/0099797 | A1 * | 5/2011 | Mishina | H02K 15/067 |
| | | | | 29/596 |
| 2011/0273033 | A1 * | 11/2011 | Nagashima | H02K 15/022 |
| | | | | 310/44 |
| 2012/0017425 | A1 * | 1/2012 | Endo | H02K 15/14 |
| | | | | 29/596 |
| 2012/0032550 | A1 | 2/2012 | Wolf | |
| 2012/0200190 | A1 * | 8/2012 | Matsuoka | H02K 15/0087 |
| | | | | 310/179 |
| 2013/0214634 | A1 * | 8/2013 | Hasegawa | H02K 15/0435 |
| | | | | 310/194 |
| 2014/0132096 | A1 * | 5/2014 | Takeda | H02K 15/026 |
| | | | | 310/71 |
| 2014/0201979 | A1 * | 7/2014 | Yamaguchi | H02K 15/065 |
| | | | | 29/596 |
| 2014/0225465 | A1 * | 8/2014 | Goto | H02K 3/28 |
| | | | | 310/71 |
| 2014/0237811 | A1 | 8/2014 | Guercioni | |
| 2015/0059164 | A1 * | 3/2015 | Onda | H02K 15/0087 |
| | | | | 29/596 |
| 2015/0180319 | A1 * | 6/2015 | Kimura | H02K 15/0087 |
| | | | | 29/596 |

FOREIGN PATENT DOCUMENTS

| | | |
|---|---|---|
| EP | 2661801 A1 | 11/2013 |
| JP | 2013172575 A | 9/2013 |

OTHER PUBLICATIONS

German Office Action dated Aug. 25, 2016 for corresponding German Patent Application No. 10 2015 217 936.2.

* cited by examiner

METHOD AND ONE-PIECE TOOL ASSEMBLY FOR PRODUCING A STATOR FOR AN ELECTRICAL MACHINE

CROSS-REFERENCE TO RELATED APPLICATIONS

This application claims the benefit of PCT Application PCT/EP2016/070812, filed Sep. 5, 2016, which claims priority to German Application DE 10 2015 217 936.2, filed Sep. 18, 2015. The disclosures of the above applications are incorporated herein by reference.

TECHNICAL FIELD

The disclosure relates to a method and one-part tool arrangement for producing a stator for an electrical machine.

BACKGROUND

For generating a magnetic rotary field, a stator of an electrical machine has a laminated core and electrical coils. The laminated core consists of layers of magnetically soft metal sheets that are electrically insulated from one another. Arranged in the laminated core are slots, in which in turn electrical conductor elements of the coils are respectively arranged.

The coils as a whole are referred to as a winding. In the case of the two-layer winding mentioned, two conductor elements are respectively arranged for each slot. The conductor elements lying radially on the outside in the slots form an outer ring or an outer layer of the two-layer winding. The radially inner conductor elements form an inner ring or a radially inner layer. The conductor parts of the conductor elements of one layer that protrude out of the end face of the laminated core are crossed or transposed in the circumferential direction with the conductor parts of the conductor elements of the other layer that protrude out of the end face. By subsequently electrically connecting conductor ends of one layer to a corresponding conductor end of the other layer, the individual conductor elements may be specifically electrically interconnected with one another and in this way the electrical coils can be formed.

In order to obtain electrical terminal ends for the electrical coils and also a number of loops or turns per coil, it is necessary to choose the transposition irregularly for particular, selective conductor ends, such that in this way an interconnecting region that has on the one hand free-standing coil terminals and on the other hand an interturn transition from one turn of the coil to the next turn is obtained. As a result of such interconnecting regions, the pattern of the transposition along the circumference has an irregularity, which entails the problem that in automated machine-production of a stator the conductor ends have to be laboriously positioned relatively in relation to one another. This is laborious in particular because all of the conductor parts protruding out of the end face of the laminated core have to be bent once again for the transposition.

Known solutions envisage pre-bending the conductor elements before they are arranged in the slots. However, this necessitates tolerances that result in an unfavorable or less-than-optimum axial end winding height of the end winding.

SUMMARY

The disclosure relates to a method for producing a stator of an electrical machine and to a tool arrangement for carrying out the method. The stator has a two-layer winding, which for each slot of a laminated core respectively has an electrical conductor element for a radially outer layer and an electrical conductor element for a radially inner layer of the two-layer winding. Each conductor element may respectively be for example an insulated wire. Finally, the disclosure also includes the finished stator.

One aspect of the disclosure provides a method for producing a stator. For a radially outer layer and a radially inner layer of a two-layer winding, an electrical conductor element for each layer is respectively arranged in a manner known per se in slots of a laminated core. Each conductor element may be an insulated wire or an insulated copper bar. It is therefore then a bar winding. It is also possible for two conductor elements to be respectively provided by a wire in the form of a U, which is also referred to as the hairpin technique.

Each of the layers, i.e., each ring of conductor elements, can then be processed separately. In the case of one or both of the layers, according to the method, a tool with receiving regions that are arranged in a ring is respectively provided on an end face of the laminated core. A relative arrangement of the receiving regions of the tool along a circumferential direction of the ring corresponds to a relative end position, which is provided for the conductor ends of the conductor elements of the layer for interconnection. By the interconnection, some of the conductor ends are thereby interconnected with corresponding conductor ends of the conductor elements of the other layer. In other words, the relative arrangement or the relative position of the receiving regions in the tool corresponds to the relative arrangement or relative position of the conductor ends in the finished state of the stator.

In a positioning process, the tool is moved into a first turning position and each conductor end of a first group of the conductor elements of the layer is respectively inserted into one of the receiving regions. Then the tool is turned into at least one further turning position and each conductor end of a further group of the conductor elements of the layer is in each case respectively inserted into one of the receiving regions. Altogether, as many groups are provided as it takes until the conductor ends of all the conductor elements are in the relative end position in relation to one another by each conductor end being inserted in a receiving region. The turning of the tool between the insertion of further conductor ends into receiving regions has the effect that the conductor ends already inserted in the receiving regions are in each case turned by a predetermined turning angle about the axis of the stator. As a result, different turning angles or positions can thus be respectively set for different groups of conductor elements. This then ends the positioning process.

After the positioning process, the conductor ends are inserted in the tool and are already in their relative end position in relation to one another. Therefore, the end winding can subsequently be formed by the pins or conductor parts of the conductor elements that project out of the laminated core being bent or transposed, without the relative end position of the conductor ends changing as this happens. The conductor ends are kept in their relative end position in relation to one another by the tool. This allows a compact end winding to form, without the conductor ends having to be newly positioned thereafter. The tool mentioned can respectively be of a one-part design, in particular for each layer.

In some implementations, altogether three groups are provided, of which one of the groups includes the conductor ends of a normal region, one of the groups includes the conductor ends for interconnecting turns of the individual coils, and one of the groups includes the conductor ends for coil terminals of the coils, for all of the electrical coils of the stator that are provided. As a result, consequently a respective turning position for the decisive types of conductor ends is provided. Which group forms the first group here may be decided by a person skilled in the art, according to the design of the tool. The same applies to the second group. The conductor ends for interconnecting and the conductor ends for the coil terminals together form an interconnecting region.

In some implementations, for arranging them in the slots and for inserting the conductor ends into the receiving regions, the conductor elements are respectively provided as straight bars, which are in each case inserted through one of the slots. In other words, all of the conductor elements are designed uniformly, to be specific as straight bars. This makes the production of the stator efficient.

In some examples, the conductor elements are fired into the slots. In other words, enough momentum is imparted to each conductor element that it moves of its own accord along the slot and directs the conductor end into the receiving region. The firing may be automated, and thereby makes it possible for a conductor element to be arranged in less than one second.

In some implementations, after the positioning process the conductor elements of one of the layers or both layers are respectively bent in a twisting process. The twisting process may include, for each layer, a relative turning of the tool with respect to the laminated core and at the same time bringing together of the tool and the laminated core, so that the conductor pieces or conductor parts of the conductor elements of the layer that protrude out of the laminated core are bent along the circumferential direction. The conductor parts are bent here by all of the conductor parts having a skewing region, all of which have the same skewing angle with respect to an end face of the laminated core. This produces a compact end winding, the axial dimension of which can be minimized.

In some examples, the twisting process is carried out for both layers, where a respective tool is provided in each case for both layers and the twisting process is carried out in opposite circumferential directions for the layers, so that the projecting conductor parts of one of the layers and the projecting conductor parts of the other layer are transposed with one another. As such, the conductor ends of a layer that are to be electrically connected may be arranged radially in line with the corresponding conductor ends of the other layer. Therefore, the conductor ends that are respectively arranged radially in line can then be welded or soldered without further forming.

Another aspect of the disclosure provides a tool arrangement for producing a stator for an electrical machine. By using the tool arrangement, an example of the method according to the disclosure can be carried out. For this purpose, the tool arrangement has a respective tool for at least one layer of a two-layer winding of the stator, where each tool has respective receiving regions for inserting a conductor end of a conductor element and where a relative arrangement of the receiving regions along a circumferential direction of the ring corresponds to the described relative end position for the conductor ends. The tool arrangement has furthermore a holding device for holding a laminated core in such a way that an end face of the laminated core is facing the at least one tool. Furthermore, a movement device is provided, such that, with a laminated core arranged in the holding device, for each layer conductor ends of conductor elements for the layer are respectively to be arranged in a receiving region in each case in a positioning process and for this purpose the tool is to be moved into a first turning position and each conductor end of a first group of the conductor elements of the layer is to be respectively inserted into one of the receiving regions, then the tool is to be turned into at least one further turning position and each conductor end of a further group of the conductor elements of the layer in each case is to be respectively inserted into one of the receiving regions, until the conductor ends of all the conductor elements of the layer have been respectively inserted into a receiving region and, as a result, are in the relative end position in relation to one another. The movement device allows the insertion of three groups of conductor elements into the tool in the described way in the positioning process.

In some implementations of the tool arrangement, the movement device is designed for the purpose that, after the positioning process, the tool of each layer on the one hand and the laminated core on the other hand are to be brought together in a twisting process and, during that, the tool is to be turned in relation to the laminated core, so that the conductor elements are uniformly bent by the same skewing angle with respect to the end face of the laminated core.

Another aspect of the disclosure provides a finished stator for an electrical machine, where the stator is produced by an example of the method according to the disclosure and/or by m an example of the tool arrangement according to the disclosure. As a result, the stator has the distinctive compact end winding, in the case of which the conductor parts of the conductor elements that protrude out of the end face all have the same skewing angle, and nevertheless some of the conductor ends are in an end position for an interconnection of turns of the coils and some are in an end position for a coil terminal.

In some implementations, it is provided that radially inner slot openings of the slots have in the circumferential direction a gap width or slot width which is less than a dimension of the conductor elements that are respectively arranged in the slots. The dimension is in this case measured in the same circumferential direction as the slot width. In other words, the conductor elements cannot be placed in the slot along the radial direction, but can only be inserted by way of one of the end faces. Such a small slot width, with at the same time transposed conductor elements in the end winding, is only possible by the method according to the disclosure and/or the tool arrangement according to the disclosure.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
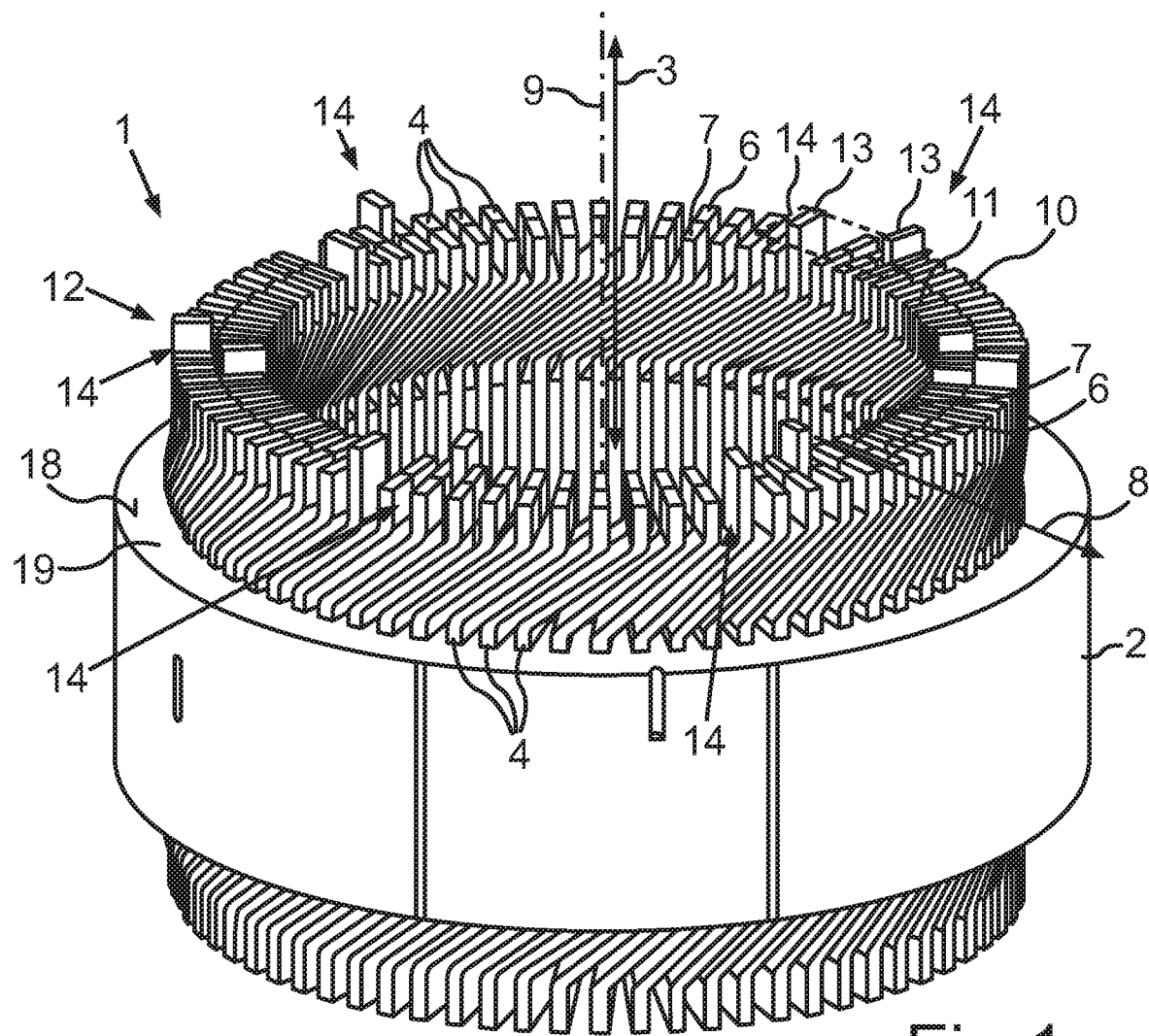
FIG. 1 shows a schematic representation of a perspective view of an example of the stator according to the disclosure.

FIG. 1 shows a stator 1 for an electric machine. The stator 1 can be provided, for example, for a starter generator of a motor vehicle. The stator 1 has a laminated core 2 which may be formed in a manner known per se from layers of magnetically soft metal sheets (coercive field strength lower than 1000 A/m) that are electrically insulated from one another and are stacked or layered along an axial direction 3.

In slots 4 of the laminated core 2, in each case two conductor elements 6, 7 have been inserted through an axial slot opening 5. For the sake of clarity, in each case only some of the specified elements have been provided with a reference symbol. The conductor elements 6, 7 of each slot 4 are arranged aligned one behind the other in a radial direction 8. The radial direction 8 is directed perpendicularly outward in each case from an axis 9 by which the axial direction 3 is defined. The axis 9 corresponds to the intended rotational axis of a rotor which can be arranged in the stator.

The different radial distances between the conductor elements 6, 7 result in two rings or layers 10, 11, where the radially outer conductor elements 6 form the layer 10 and the radially inner conductor elements 7 form the layer 11. The layers 10, 11 are components of a two-layer winding 12 of the stator 1. In the example shown, the two-layer winding 12 includes six electrical coils, each of which is produced by interconnecting a respective subset of the conductor elements 6, 7. In each case, one conductor element of the outer layer 10 and one conductor element of the inner layer 11 form a phase connection or coil terminal 13 of one of the coils. The coil terminals 13 of a coil are each arranged in an interconnecting region 14.

Figure 2:
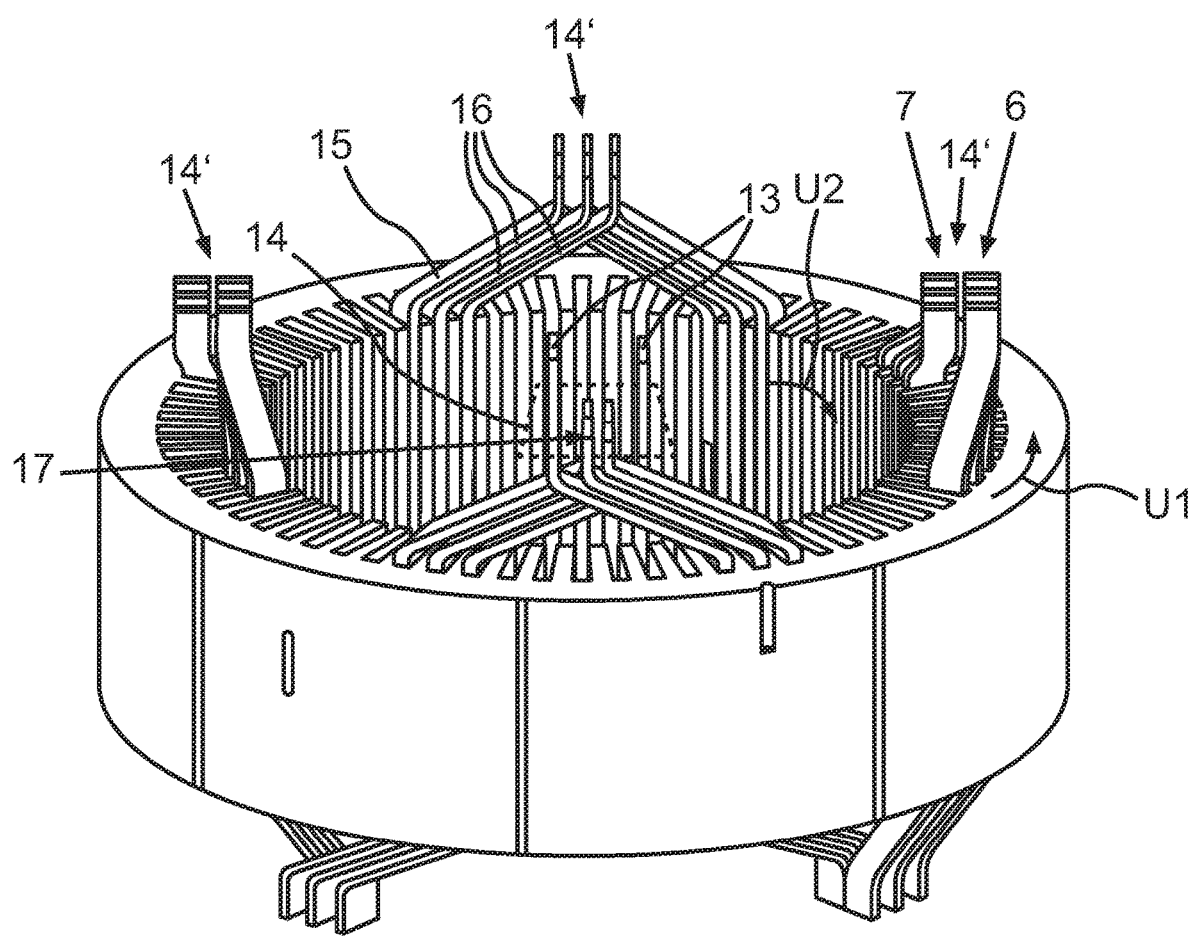
FIG. 2 shows a schematic representation of a single electrical coil of the stator from FIG. 1.

FIG. 2 shows, for the purpose of illustration, a single electrical coil 15. The illustration in FIG. 2 corresponds to the illustration in FIG. 1, where all those conductor elements 6, 7 which are associated with the other electrical coils are omitted. The coil 15 illustrated in FIG. 2 has a total of three loops or turns 16 which are interconnected electrically to one another within the interconnecting region 14 by an interconnecting of turns 17.

To form the turns 16 of the coil 15, the conductor elements 6 of the outer layer 10 have been skewed or bent along a circumferential direction U1, while the conductor elements 7 of the inner layer 11 have been skewed or bent in an opposite circumferential direction U2. As a result, the conductor elements 6, 7 of the two layers 10, 11 are transposed with one another.

For forming the coil terminals 13 and the interconnection of turns 17, the conductor elements 6, 7 are selectively shaped in the interconnecting region 14 in a special way. The interconnections of the conductor elements 6, 7 outside the interconnecting region 14 together represent a normal region 14', in which no selective shaping is necessary.

Figure 3:
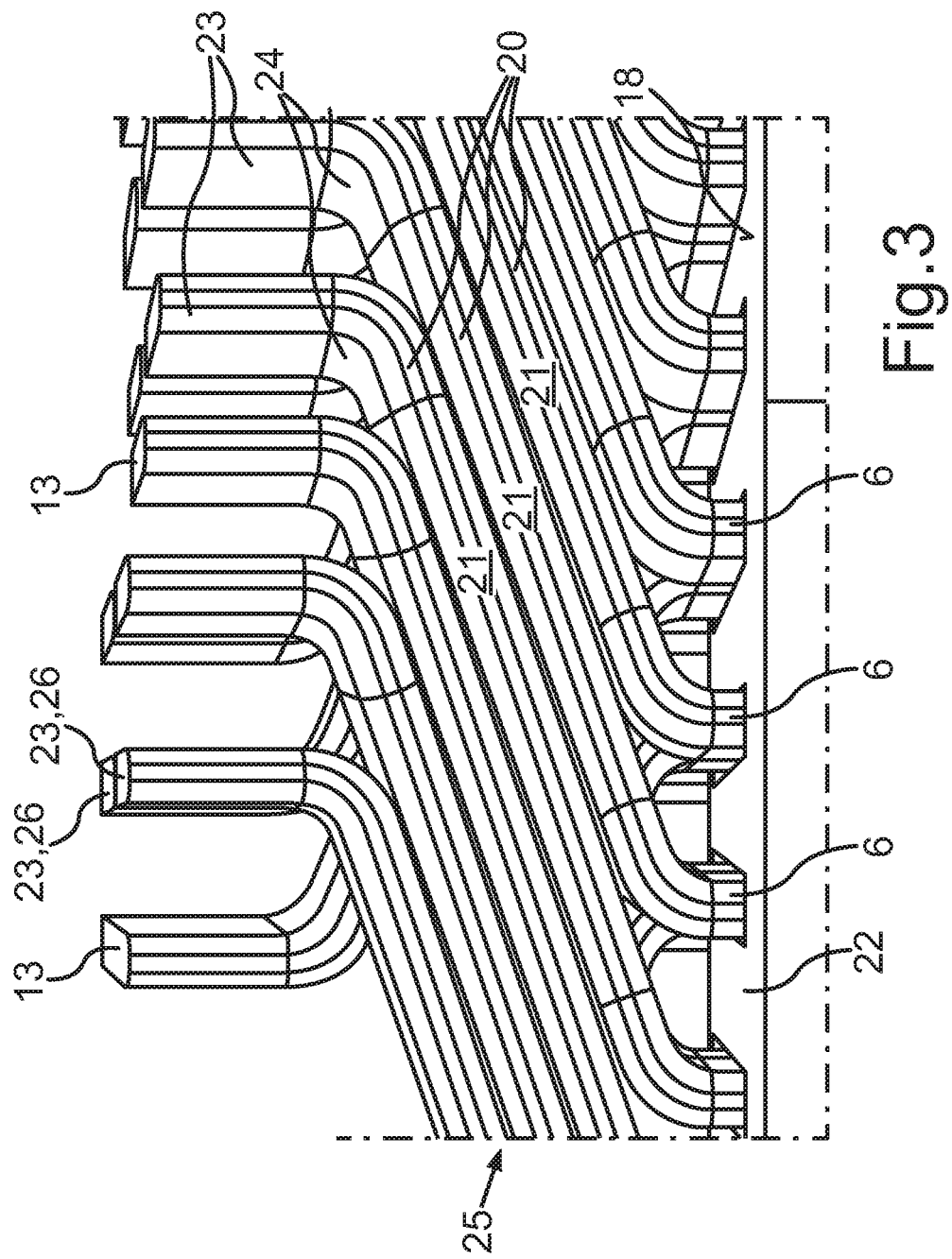
FIG. 3 shows a schematic representation of a perspective view of an interconnecting region of turns of the coil from FIG. 2 and also electrical coil terminals of the coil.
Figure 4:
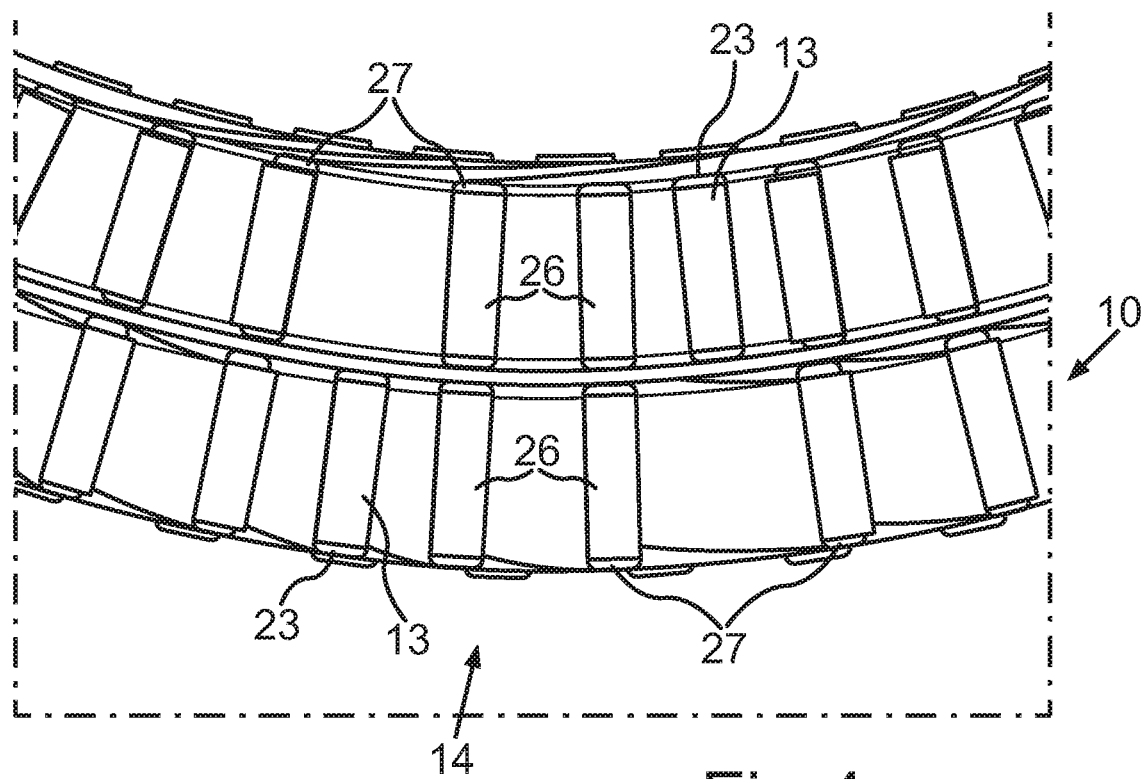
FIG. 4 shows a schematic representation of the interconnecting region from FIG. 3 in a plan view.

The interconnecting region 14 is represented once again in an enlarged form in FIG. 3 and FIG. 4.

In FIG. 3 it is shown how, for forming the coil 15 and the other coils from the electrical conductor elements 6, 7, in each case the pin ends or conductor parts 20 that project from an end face 18 at one axial end 19 of the laminated core 2 have been skewed or bent, so that a skewing region 21 has a skewing angle 22 with respect to the end face 18.

The conductor parts 20 also have conductor ends 23, which are aligned parallel to the axis 9. The conductor parts 20 have for this purpose a cranked offset 24.

The skewing angles 22 of all the skewing regions 21 of the conductor parts 20 are the same. As a result, the conductor parts 20 lie closely one on top of the other. The conductor parts 20 are part of an end winding 25 at the end face 18 of the laminated core 2.

In the interconnecting region 14, a conductor end 23 of the outer layer 10 and a conductor end 23 of the inner layer 11 are respectively arranged axially in line in pairs and electrically interconnected with one another. The electrical interconnection may have been performed for example by welding or soldering the conductor ends 23. The turns 16 are interconnected with one another in the interconnecting region 14 by way of the conductor ends 23. These conductor ends 23 are therefore referred to hereinafter as interconnecting ends 26. The coil terminals 13 are formed in each case by a conductor end 23 of the interconnecting region 14, which is arranged between two adjacent conductor ends 27 of the other layer 10, 11 respectively.

Outside the interconnecting region 14 in the normal region 14', the conductor ends 23 are arranged at uniform angular spacings from one another. By contrast, in the interconnecting regions 14, it is necessary to vary the angular spacings of the conductor ends 23, as shown in FIG. 4, in order to form on the one hand the coil terminals 13 and on the other hand the interconnecting ends 26.

In order to form the end winding 25 on the stator 1, the conductor elements 6, 7 are deformed in such a way that the skewing regions 21 and the cranked offset 24 are obtained and the conductor ends 23 are arranged in the described relative positions in relation to one another, so that the conductor ends 23 in the normal region 14' have regular or uniform angular spacings from one another and in the interconnecting region 14 the conductor ends 23 are formed into the coil terminals 13 and the interconnecting ends 26.

Figure 5:
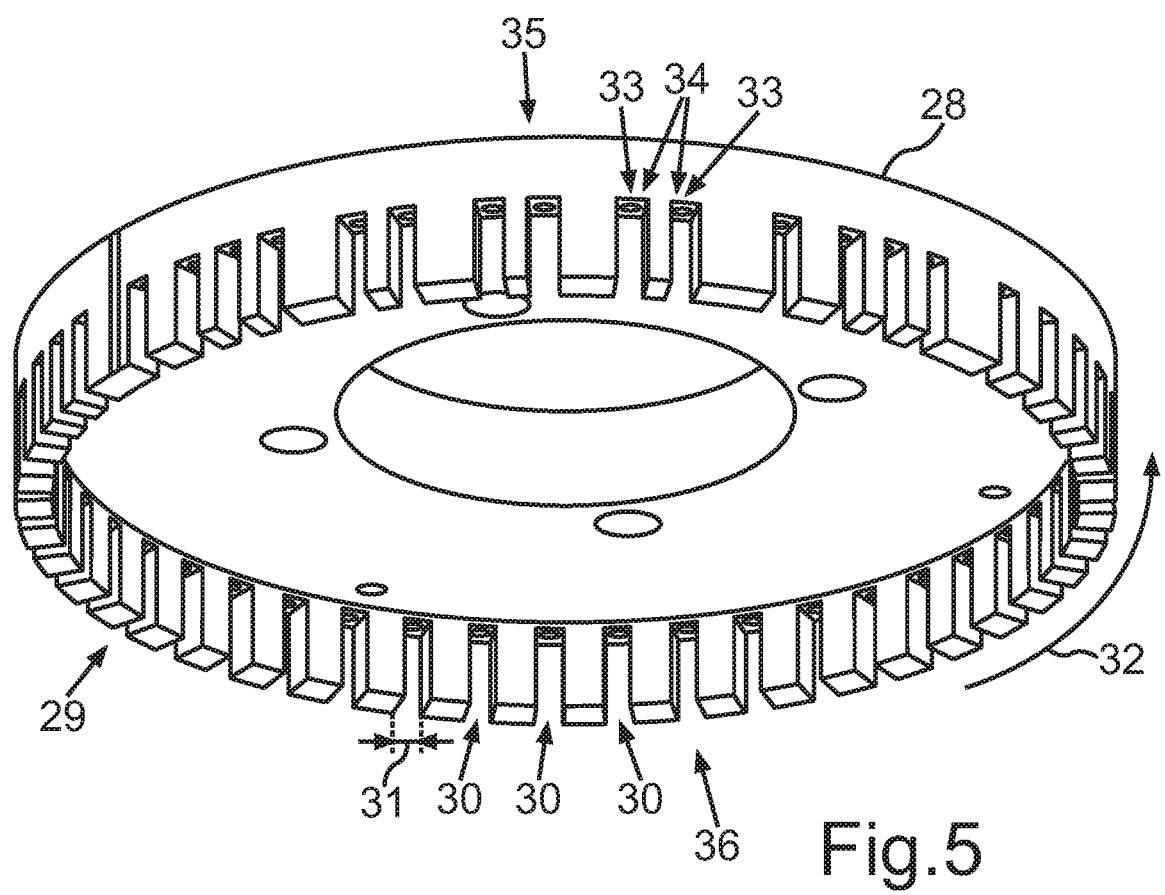
FIG. 5 shows a schematic representation of a tool for producing an end winding of the stator.

FIG. 5 shows in this respect a tool 28 for working or processing one of the layers 10, 11. The tool 28 may be a circular disk, on which a ring 29 with receiving regions 30 is formed along a circumference. As shown in FIG. 5, only some receiving regions 30 are provided with a reference sign. The tool 28 may be designed as a cogwheel, the cogs being formed by the clearances of the receiving regions 30. Each receiving region 30 may have a dimension 31 in the circumferential direction that corresponds to a diameter of an individual conductor element 6, 7. This produces a firm fit of each conductor end 23 after insertion into a receiving region 30. Along a circumference 32, a relative position or relative arrangement of the receiving regions 30 is such that it corresponds to the relative arrangement of the conductor elements 30 in the finished state of the stator 1, as it is represented in FIG. 1.

A through-opening 34, through which an ejecting force may be exerted on the conductor ends 23 from a rear side 35 by a pin after the ending of a twisting process, may be provided in each case on a respective bottom 33 of each receiving region 30.

Figure 6:
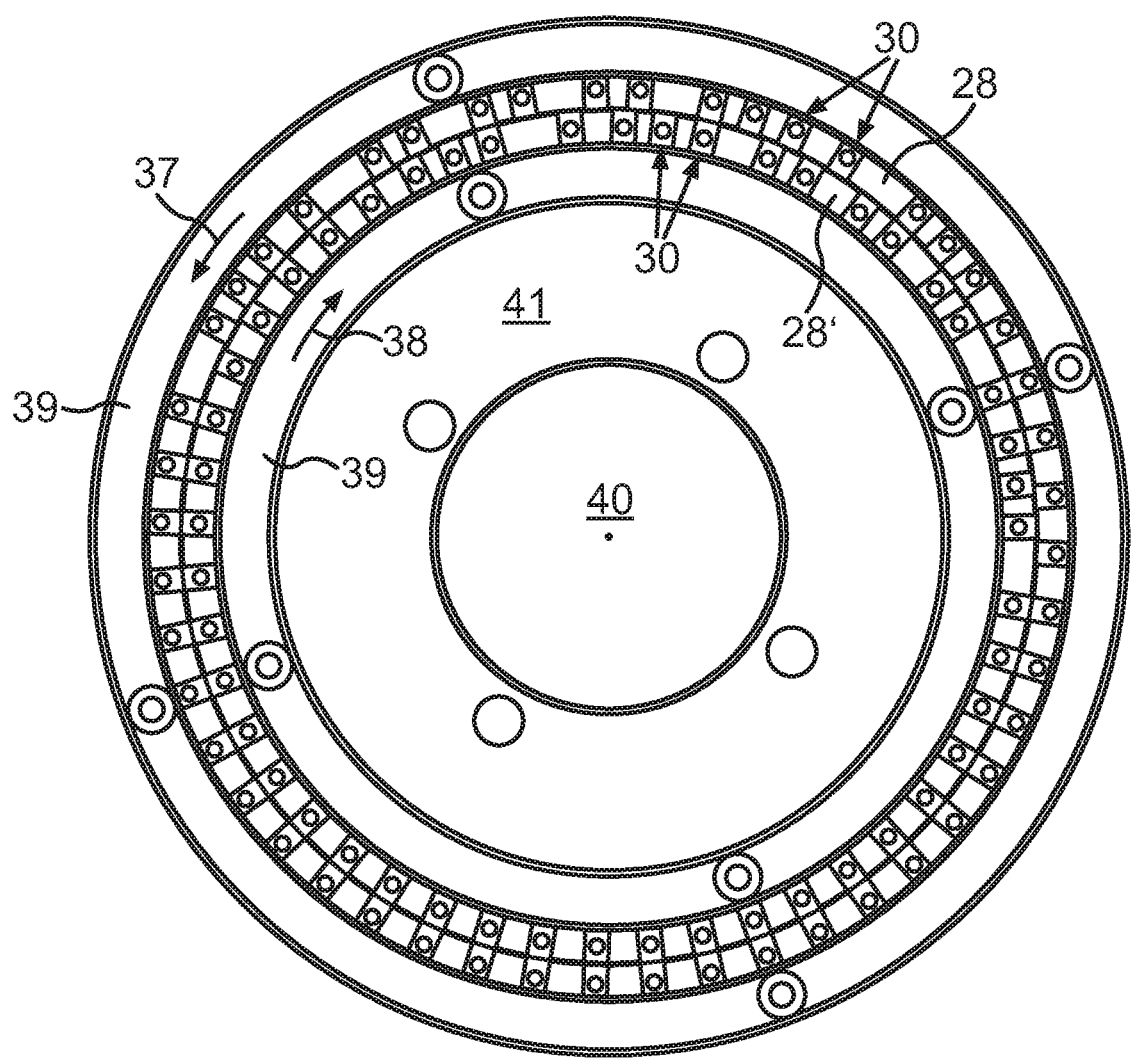
FIG. 6 shows a schematic representation of a plan view of a tool arrangement with two tools, one of which is represented in FIG. 5.

FIG. 6 shows a plan view of the tool 28 from an insertion direction 36 that is illustrated in FIG. 5. The insertion direction 36 corresponds to the movement direction along which the conductor elements 6, 7 are inserted with their conductor ends 23 into the receiving regions 30. In FIG. 6, shown in addition to the tool 28 is a further tool 28', which is provided for processing the other layer 11. The tools 28, 28' are arranged relatively rotatably in relation to one another, so that, with respectively inserted conductor ends of the conductor elements 6, 7, the conductor parts 20 of the two layers 6, 7 can be transposed with one another by opposite turning directions 37, 38 about the axis 9. For axial stabilization of the inserted conductor ends 23, a surround 39 is provided. For weight reduction, the tool is formed with a clearance 40 in the middle region that is not required. A torque transmission from a movement device can take place by way of a flange 41.

Figure 7:
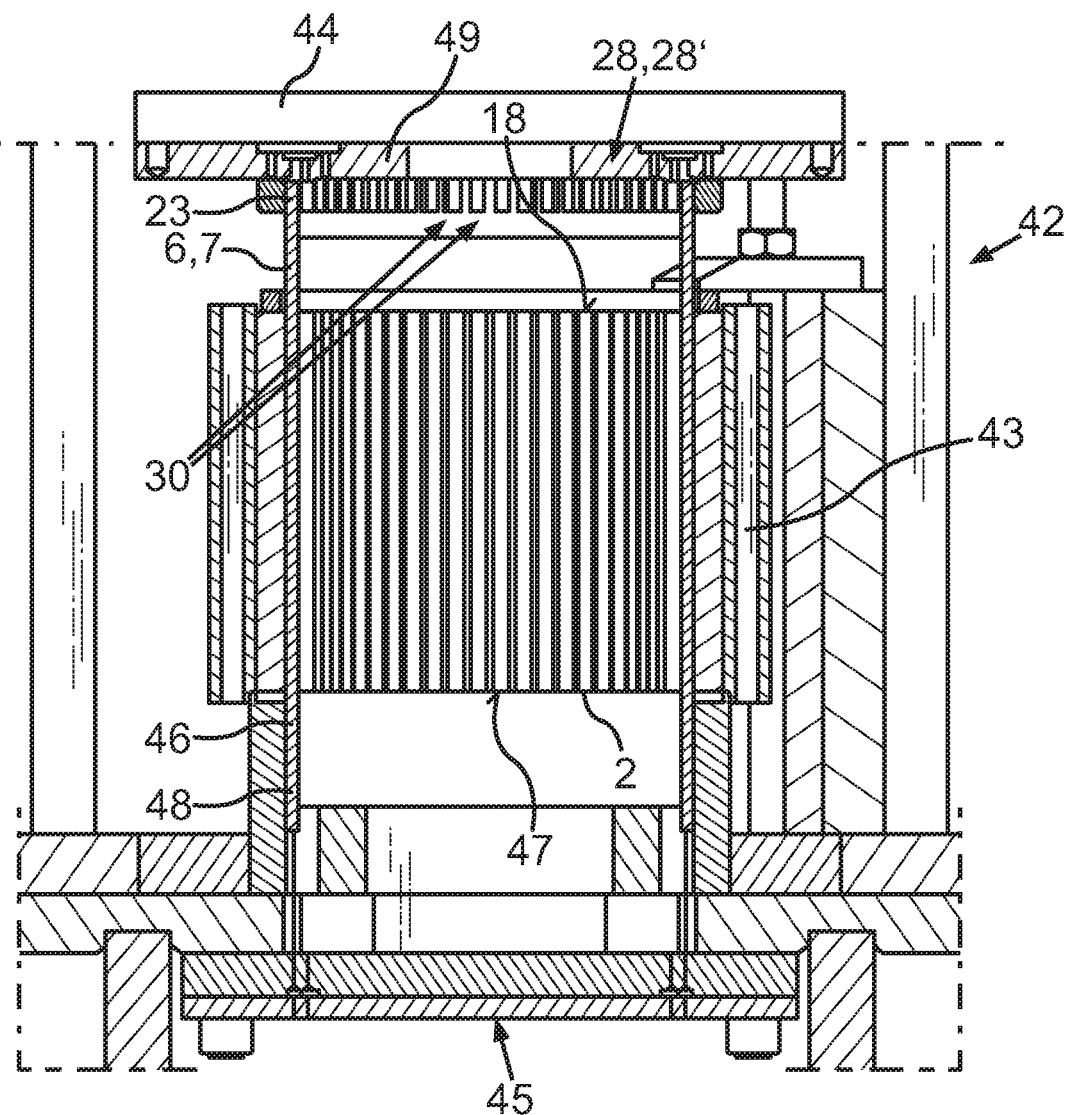
FIG. 7 shows a schematic representation of a longitudinal section of the tool arrangement after the insertion of a first group of conductor elements during a positioning process.

FIG. 7 illustrates the complete tool arrangement 42 for producing the stator 1. In addition to the tools 28, 28', a holding device 43 for the laminated core 2 in the unloaded state is provided. The tools 28, 28' are for example connected by way of their flange 41 to a movement device 44, which is designed for the purpose of moving the tools 28, 28' relatively with respect to the holding device 43. Furthermore, the movement device 44 has a loading unit 45, by which the conductor elements 6, 7 are inserted in groups into the slots 4 through the axial slot opening 5 of the slots 4 axially parallel to the axis 9 and the conductor ends 23 are inserted into the receiving region 30 that is respectively axially in line with the slot.

In FIG. 7 it is shown here how, at the beginning of the production of the stator 1, conductor elements 6, 7 have in each case been inserted into the slots 4 as straight bars 46. Here, the bars 46 may be of the same axial length. As shown in FIG. 1, it may however also be provided that the conductor bars that are intended to provide coil terminals 13 are longer than the other conductor elements. Furthermore, it should be noted that the described interconnecting regions 14 are only provided on one end face 18. On an opposite end face 47, all of the conductor elements may be formed uniformly, i.e., only a normal region and no interconnecting region is provided there.

The bars 46 may have been inserted into the slots 4 along the axial direction 3. As a result, an insert winding of the electrical coils of the stator 1 is obtained.

FIG. 7 shows in this case a first process step of a positioning process for the conductor elements 6, 7, in which a first group 48 of conductor elements 6, 7 is inserted into the laminated core 2 and the conductor ends 23 are positioned in the tools 28, 28'. The first group 48 is represented in FIG. 7 by a single conductor element 6, 7. For inserting the conductor ends, the tools 28, 28' have been turned into a first turning position 49 with respect to the laminated core 2 by the movement device 44. The laminated core 2 and/or the respective tool 28, 28' may be turned here.

After the insertion of the conductor ends 23, in a further process step a relative turning of the tools 28, 28' with respect to the laminated core 2 is carried out by the movement device 44. As a result, other slots 4 are then arranged in line with respective receiving regions 30.

Figure 8:
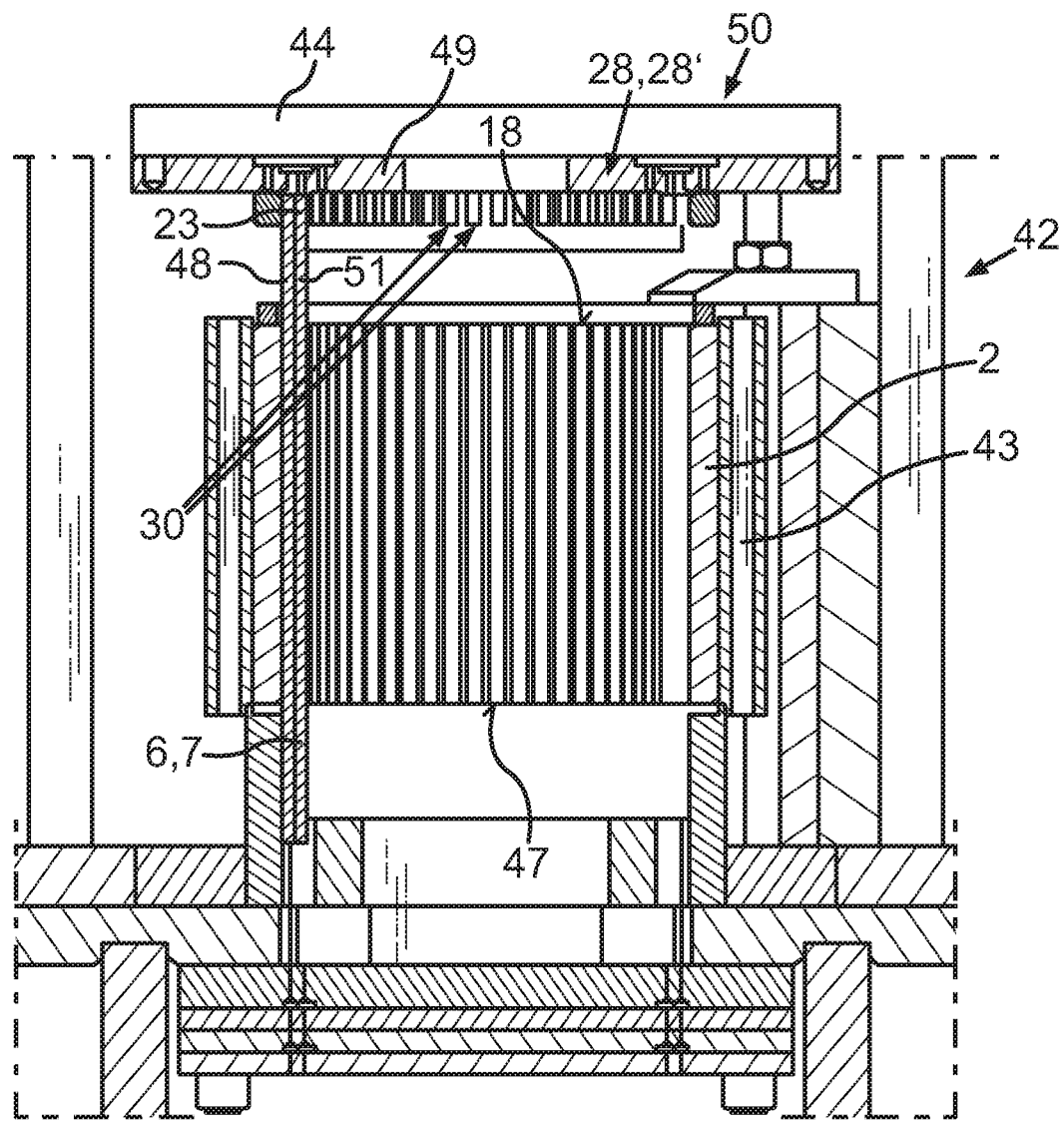
FIG. 8 shows a schematic representation of the longitudinal section from FIG. 7 after the insertion of a second group of conductor elements during the positioning process.

The further turning position is represented in FIG. 8 as the turning position 50. Then, a second group 51 of conductor elements 6, 7 may be inserted into the laminated core 2 through slots 4 provided for this purpose and the conductor ends 23 can be inserted into the provided receiving regions 30 of the tools 28, 28'. In FIG. 8, the second group 51 is represented by a single conductor element 6, 7.

It is not shown how a further group, for example, a third group, of conductor elements may be inserted after a further relative turning of the tools 28, 28' with respect to the laminated core 2. One of the groups may be provided for the conductor elements of the normal region, a further group for the coil terminals 13 and the third group for the connecting ends 26.

The following twisting process is then obtained. The conductor ends 23 of the conductor elements 6, 7 of each layer 10, 11 have been received axially in the tool regions 44, 45, in the pockets arranged there. The fixing of the conductor ends 23 in the pockets takes place during the twisting process by passive clamping. This is ensured by correspondingly little play between the conductor ends 23 and the pockets. Then, for the twisting process, the tool regions 44, 45 are rotated oppositely for the inner and outer layers 10, 11, and thereby transpose all of the conductor ends 23 uniformly by an identical turning angle along the circumferential direction.

The described design of the pockets has the effect that, before the actual twisting process, the conductor ends 23 are already in final positions of being relatively aligned in relation to one another.

The sequence of the forming operation is consequently altogether as follows, while movements that are necessary because of bracing and springing back have not been described here.

In order to achieve the effect that the pin ends or conductor parts 20 of the insert winding that protrude out of the laminated core 2 are already in their final relative alignment in relation to one another before the actual twisting process begins, the conductor parts 20 must be received in the receiving regions 30 of the tool 28, 28' in a number of process steps. This takes place by progressively pushing certain groups 48, 51 of the conductor elements 6, 7 through the laminated core 2 into the radially arranged receiving regions 30, followed by progressively twisting or turning the respective tool 28, 28'. A possible sequence of this forming operation is as follows:

Process step 1: Pushing a first group 28 of conductor elements 6, 7 through the laminated core 2, so that the conductor ends 23 are received in receiving regions 30 of the tools 28, 28'.

Process step 2: Radially moving or turning the tool 28, 28' by a certain turning angle with respect to the intended turning angle for the normal region 14'.

Process step 3: Pushing a second group 51 of conductor elements 6, 7 through the laminated core 2, so that the conductor ends 23 are received in predetermined receiving regions 30.

Process step 4: Radially moving or turning the tools 28, 28' by a further certain turning angle.

Process step 5: Pushing a third group of conductor elements 6, 7 through the laminated core 2, so that the conductor ends 23 are received in the receiving regions 30 that are still free.

In a process step 6, the actual twisting process is then carried out, in which a twist-turning 52 of the tool 28 in the circumferential direction 37 and a twist-turning of the tool 28' in the circumferential direction 38 can be carried out, and the tools 28, 28' are thereby brought together or pressed together with the laminated core 2. This then produces the end winding 25.

Finally, after taking off or removing the tools 28, 28', the conductor ends 23 can then be soldered or welded. A laser welding method may for example be provided for this purpose.

Altogether, the example shows how a tool variant for selective twisting when transposing pin ends in the production of motor windings can be provided by the disclosure.

A number of implementations have been described. Nevertheless, it will be understood that various modifications may be made without departing from the spirit and scope of the disclosure. Accordingly, other implementations are within the scope of the following claims.

What is claimed is:

1. A method for producing a stator comprising the steps of:
providing a two-layer winding (12) having a radially outer layer (10) and a radially inner layer (11);
providing plurality of electrical conductor elements (6,7), a portion of the plurality of electrical conductor elements (6,7) being part of the radially outer layer (10), and a portion of the plurality of electrical conductor elements (6,7) being part of the radially inner layer (11);
providing a plurality of conductor ends (23), one or more of the plurality of conductor ends (23) being part of a corresponding one of the plurality of electrical conductor elements (6,7);
providing a laminated core having an end face and a plurality of slots;
arranging each of the plurality of electrical conductor elements in one or more of the slots of the laminated core;
providing a tool having a plurality of receiving regions arranged in a ring on an end face of the laminated core; and a relative arrangement of the receiving regions along a circumferential direction of the ring corresponds to a relative end position for one or more of the plurality of conductor ends of the conductor elements of the radially outer layer for interconnection with one or more of the plurality of conductor ends of the plurality of electrical conductor elements of the radially inner layer;
providing a plurality of through-openings, each of the plurality of through-openings being part of a corresponding one of the plurality of receiving regions;
providing a positioning process, the positioning process comprising the steps of:
moving the tool into a first turning position;
inserting each of the plurality of conductor ends of a first group of the conductor elements of the layer into one of the receiving regions;
turning the tool into at least one further turning position; and
inserting each of the plurality of conductor ends of a further group of the conductor elements of the layer into one of the receiving regions until the plurality of conductor ends of all the plurality of conductor elements of the layer are in the relative end position in relation to one another.

2. The method of claim 1, further comprising the steps of:
providing at least one coil;
providing a normal region, a portion of the plurality of conductor ends being located in the normal region;
providing a plurality of groups each of the plurality of groups being part of the at least one coil;
providing one of the plurality of groups to further comprise the conductor ends of the normal region;
providing one of the plurality of groups to further comprise the plurality of conductor ends for interconnecting turns of the at least one coil;
providing one of the plurality of groups to further comprise the plurality of conductor ends for coil terminals of the at least one coil.

3. The method of claim 1, further comprising the steps of:
providing each of the plurality of electrical conductor elements to further comprise a straight bar;
inserting the plurality of electrical conductor elements through a corresponding one of the plurality of slots when inserting each of the plurality of conductor ends into a corresponding one of the receiving regions.

4. The method of claim 3, further comprising the steps of firing the plurality of electrical conductor elements into the slots.

5. The method of claim 1, further comprising the steps of providing a twisting process;
providing a plurality of conductor parts, each of the plurality of conductor parts being part of a corresponding one of the plurality of electrical conductor elements (6,7);
completing the twisting process after the positioning process;
bending the conductor ends of one of the radially outer layer or the radially inner layer in the twisting process by relative turning of the tool with respect to the laminated core and at the same time bringing together of the tool and the laminated core, so that each of the plurality of conductor parts of the plurality of conductor elements of the outer layer and each of the plurality of conductor parts of the plurality of conductor elements of the inner layer that protrude out of the laminated core are bent along the circumferential direction, so that each of the plurality of conductor parts have a skewing region, all of which have the same skewing angle with respect to the end face of the laminated core.

6. The method of claim 5, further comprising the steps of:
providing a first tool for the radially outer layer (10)
providing a second tool for the the radially inner layer (11)
carrying out the twisting process in opposite circumferential directions for the radially outer layer (10) and the radially inner layer (11) so that the projecting conductor parts of one of the radially outer layer (10) or the radially inner layer (11) and the projecting conductor parts of the other of the radially outer layer (10) or the radially inner layer are transposed with one another.

7. The method of claim 5, further comprising the steps of exerting an ejecting force through each of the plurality of through openings to each of the plurality of conductor ends after the twisting process is completed.

8. The method of claim 1, further comprising the steps of providing radially inner slot openings of the plurality of slots, each of the radially inner slot openings have in the circumferential direction a slot width which is less than a dimension of the plurality of conductor elements that are respectively arranged in the plurality of slots.

9. A tool arrangement for producing a stator for an electrical machine, the tool arrangement comprising:
at least one tool for a radially outer layer or a radially inner layer (11) of a two-layer winding;
a ring;
a plurality of receiving regions arranged in the ring for inserting a plurality of conductor ends of a plurality of conductor elements, and a relative arrangement of the plurality of receiving regions along a circumferential direction of the ring corresponds to a relative end position for the plurality of conductor ends of the plurality of conductor elements for interconnection one or more of the plurality of conductor ends of the plurality of conductor elements of the radially inner layer or the radially outer layer of the two-layer winding;

a holding device for holding a laminated core in such a way that an end face of the laminated core is facing the at least one tool; and a plurality of through-openings, each of the plurality of through-openings being part of a corresponding one of the plurality of receiving regions;

a movement device, wherein with the laminated core arranged in the holding device, and for one of the radially outer layer or the radially inner layer, each of the plurality of conductor ends of the plurality of conductor elements are respectively arranged in one of the receiving regions in each case in a positioning process and the at least one tool is moved into a first turning position, and each of the plurality of conductor ends of a first group of the plurality of conductor elements is respectively inserted into one of the receiving regions, then the at least one tool is turned into at least one further turning position and each of the plurality of conductor ends of a second group of the plurality of conductor elements in each case is respectively inserted into one of the receiving regions, until the plurality of conductor ends of all the plurality of conductor elements have been respectively inserted into a receiving region and are in a relative end position in relation to one another.

10. The tool arrangement of claim 9, wherein the movement device is designed such that, after the positioning process, the at least one tool for each of the radially outer layer or the radially inner layer and the laminated core are brought together in a twisting process and, during the twisting process, the at least one tool is turned in relation to the laminated core, so that each of the plurality of conductor elements are uniformly bent by the same skewing angle with respect to the end face.

11. The tool arrangement of claim 10, wherein an ejecting force is exerted through each of the plurality of through openings to each of the plurality of conductor ends after the twisting process is completed.

* * * * *